United States Patent
Simpson et al.

(10) Patent No.: US 8,820,152 B2
(45) Date of Patent: Sep. 2, 2014

(54) DIAGNOSTIC METHOD FOR A REFUELING EVENT DETECTION SYSTEM

(71) Applicant: Delphi Technologies, Inc., Troy, MI (US)

(72) Inventors: Kenneth M Simpson, Swartz Creek, MI (US); Paulo F. R. Tranquilli, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 20 days.

(21) Appl. No.: 13/740,517

(22) Filed: Jan. 14, 2013

(65) Prior Publication Data

US 2014/0196526 A1   Jul. 17, 2014

(51) Int. Cl.
*G01M 15/04* (2006.01)
*G01M 15/00* (2006.01)
*F02D 41/00* (2006.01)

(52) U.S. Cl.
CPC ........... *G01M 15/00* (2013.01); *F02D 41/0025* (2013.01)
USPC ...................................... 73/114.54

(58) Field of Classification Search
CPC .............. F02D 41/0025; F02D 19/084; F02D 2200/0612; F02D 2200/0611; F02D 2200/0625
USPC ........................................ 73/114.54
See application file for complete search history.

(56) References Cited

U.S. PATENT DOCUMENTS

| | | | |
|---|---|---|---|
| 6,257,174 B1 * | 7/2001 | Huff et al. | 123/1 A |
| 6,397,668 B1 * | 6/2002 | Davison et al. | 73/114.52 |
| 7,739,025 B2 * | 6/2010 | Kawakita et al. | 701/106 |
| 7,739,903 B2 * | 6/2010 | Carr et al. | 73/114.55 |
| 7,891,168 B2 * | 2/2011 | Yurgil | 60/277 |
| 7,908,073 B2 * | 3/2011 | Takubo | 701/103 |
| 8,074,503 B2 * | 12/2011 | Tsutsumi et al. | 73/114.38 |
| 8,443,655 B2 * | 5/2013 | Matsuura et al. | 73/114.32 |
| 8,640,681 B2 * | 2/2014 | Kawai et al. | 123/575 |

* cited by examiner

*Primary Examiner* — Freddie Kirkland, III
(74) *Attorney, Agent, or Firm* — Lawrence D. Hazelton

(57) ABSTRACT

A method for diagnosing the performance of a refueling event detection system for a vehicle is provided. The method includes the steps of a) determining a fuel change amount based on a difference of an indicated fuel amount and a previously indicated fuel amount, b) determining a consumed amount of fuel consumed by the engine since a prior refueling event was detected, and c) diagnosing the performance of the refueling event detection system based on the consumed amount and the fuel change amount.

6 Claims, 2 Drawing Sheets

DIAGNOSTIC METHOD FOR A REFUELING EVENT DETECTION SYSTEM

TECHNICAL FIELD OF INVENTION

This disclosure generally relates to a method for diagnosing the performance of a refueling event detection system for a motor vehicle.

BACKGROUND OF INVENTION

Motor vehicles are typically equipped with emission control systems in order to meet regulated emission standards. In order to better control emissions, it is beneficial for the emission control system to know the composition of the fuel being consumed by the engine (e.g. ethanol content in gasoline or methane concentration in compressed natural gas). In many systems, the regulated monitoring of certain emission related components and systems are disabled during the fuel composition determination process. As such, emission control performance may be less than optimal until the fuel composition is determined by the emission control system. It is preferable to initiate this process whenever a change in the fuel composition may have occurred, such as when an increase in the amount of fuel in the fuel tank is detected, i.e. a refueling event is detected. However, regulatory requirements (such as section 1968.2 of title 13, California Code of Regulations) do not allow for the disablement of regulated emission related monitoring for unsubstantiated reasons such as erroneous detection of refueling events due to refueling event detection system malfunctions. Therefore, it is desirable to be able to diagnose the performance of a refueling event detection system.

SUMMARY OF THE INVENTION

In accordance with one embodiment, a method for diagnosing the performance of a refueling event detection system for a vehicle equipped with an engine is provided. The method includes the step of determining a fuel change amount based on a difference of an indicated fuel amount and a previously indicated fuel amount. The method also includes the step of determining a consumed amount of fuel consumed by the engine since a prior refueling event was detected. The method also includes the step of diagnosing the performance of the refueling event detection system based on the consumed amount and the fuel change amount.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
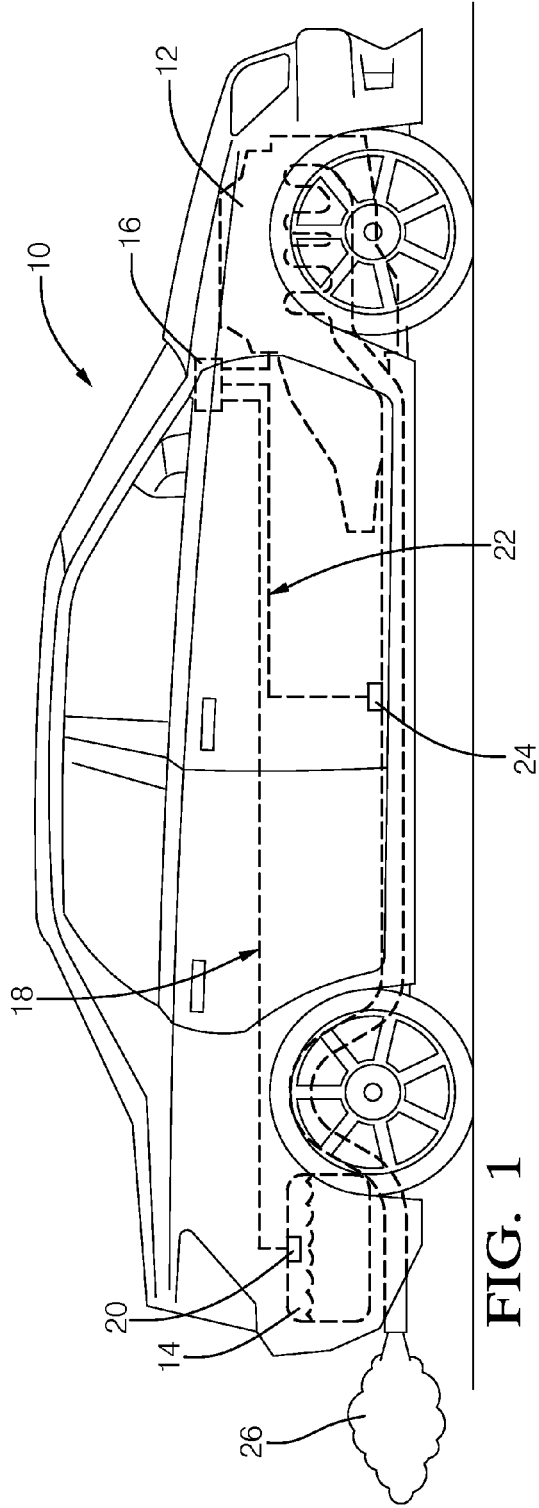
FIG. 1 is an illustration of a vehicle equipped with a refueling event detection system.

FIG. 1 illustrates a non-limiting example of a vehicle 10 that includes an engine 12, a fuel tank 14, an engine controller 16, an exhaust gas monitoring system 22 and a refueling event detection system 18. The refueling event detection system 18 may include the engine controller 16 and a refueling event sensor 20. The exhaust gas monitoring system 22 may include the engine controller 16 and an exhaust gas sensor 24. By way of example and not limitation, the refueling event sensor 20 may be a fuel level sender, fuel tank pressure sensor, a fuel inlet door switch, or any other type of sensor appropriate for sensing an indication that fuel has been added to the fuel tank 14.

When the refueling event detection system 18 detects a refueling event (i.e. indication that fuel has been added to the fuel tank 14), the engine controller 16 may shut-off the exhaust gas monitoring system 22 and initiate a fuel composition analysis in order to determine the composition of the fuel in the fuel tank 14. Once the fuel composition is determined by the engine controller 16, the engine controller adjusts the combustion control parameters for the engine 12, if required, in order to keep the composition of the exhaust gas 26 within specified limits. The engine controller 16 turns the exhaust gas monitoring system 22 back on after making the required combustion control adjustments or after making the determination that combustion control parameter adjustments are not required.

Malfunctions in the refueling event detection system 18 may cause the refueling event detection system to falsely detect or not detect refueling events. For example, the refueling event sensor 20 may be a fuel level sender with a "sticky" fuel level motion mechanism causing the fuel level sender to erroneously react to fuel level changes or rough road inputs. These erroneous reactions may cause the refueling event detection system 18 to falsely detect a refueling event or not detect a refueling event.

Figure 2:
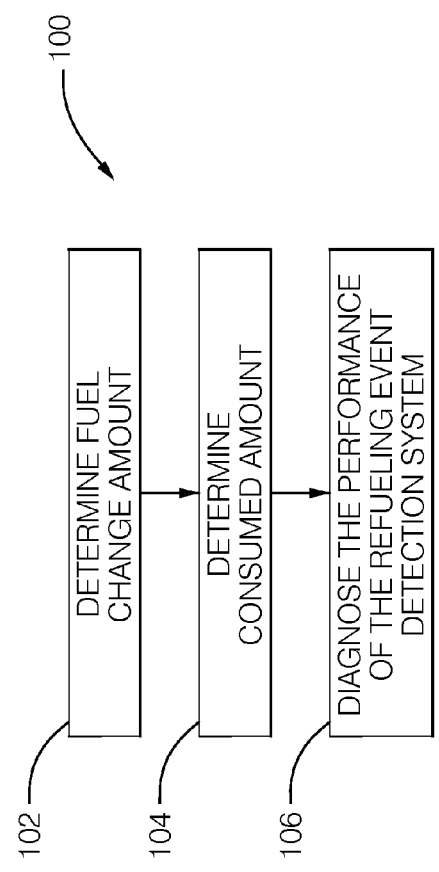
FIG. 2 is a flowchart showing a method for operating the system shown in FIG. 1 in accordance with one embodiment.

FIG. 2 illustrates the preferred embodiment of a method 100 for diagnosing the performance of the refueling event detection system 18. The method 100 is described below.

Step 102, DETERMINE FUEL CHANGE AMOUNT, includes determining a fuel change amount based on a difference of an indicated fuel amount and a previously indicated fuel amount. By way of example and not limitation, the difference may be equal to the indicated fuel amount minus the previously indicated fuel amount. Since the vehicle 10 will most likely be in a stopped position for refueling, the fuel change amount may be determined whenever the vehicle accelerates from a stopped position, or when the engine 12 is restarted. The indicated fuel amount may be determined based on a present amount of fuel in the fuel tank 14 when the vehicle 10 accelerates from a stopped position past a low speed threshold, for example 5 mph, or when the engine 12 is restarted. The previously indicated fuel amount may be determined based on a previous amount of fuel that was in the fuel tank 14 when the vehicle previously decelerated below the low speed threshold to come to the stopped position or when the engine 12 was previously shut-off. The low speed threshold may be empirically determined such that fuel amounts are adequately determined prior to and after the vehicle 10 has stopped.

Step 104, DETERMINE CONSUMED AMOUNT, includes determining a consumed amount of fuel consumed by the engine 12 since a prior refueling event was detected. The consumed amount of fuel may be determined by calculating the amount of fuel consumed by the engine 12 since the most recent detection of a refueling event by the refueling event detection system 18 or since an initial value for the previously indicated fuel amount was determined if a refueling event has not been previously detected.

Step 106, DIAGNOSE THE PERFORMANCE OF THE REFUELING EVENT DETECTION SYSTEM, includes diagnosing the performance of the refueling event detection system 18 based on the consumed amount and the fuel change amount.

Figure 3:
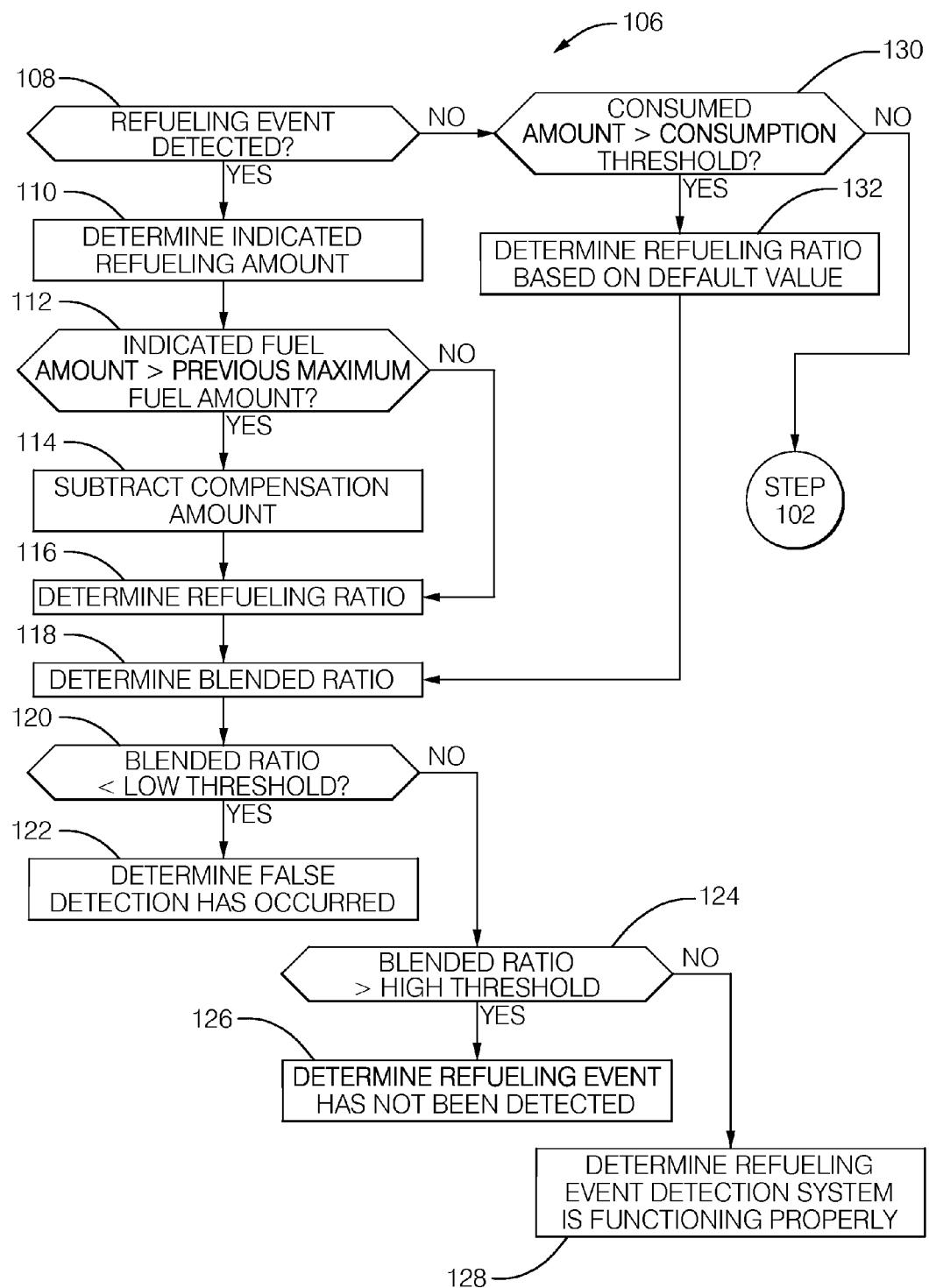
FIG. 3 is a flowchart showing some steps of FIG. 2 in more detail in accordance with one embodiment.

FIG. 3. illustrates a non-limiting example of detailed steps that may be used to perform step 106.

Step 108, REFUELING EVENT DETECTED?, includes determining if a refueling event has been detected since the previously indicated fuel amount was determined. The determination as to whether a refueling event has been detected is based on an indication from the refueling event detection system 18.

Step 110, DETERMINE INDICATED REFUELING AMOUNT, includes determining an indicated refueling amount based on the fuel change amount. By way of example and not limitation, the indicated refueling amount may be equal to the fuel change amount.

Step 112, INDICATED FUEL AMOUNT>PREVIOUS MAXIMUM FUEL AMOUNT?, includes determining if the indicated fuel amount is greater than a previous maximum fuel amount. The previous maximum fuel amount may be equal to the largest value from a plurality of previously determined values for the previously indicated fuel amount and the indicated fuel amount.

Step 114, SUBTRACT COMPENSATION AMOUNT, includes subtracting a compensation amount from the indicated refueling amount. The compensation amount may be subtracted from the indicated refueling amount due to the assumption that the amount of fuel leaving the fuel tank 14 (i.e. consumed fuel) is not substantially equal to the fuel being added to the fuel tank (i.e. fuel added via refueling events) over a period of time until a previously indicated fuel amount is at a maximum fuel storage capacity amount for the fuel tank 14. The compensation amount may be determined based on a difference of the indicated fuel amount and the previous maximum fuel amount. By way of example and not limitation, the compensation amount may be equal to the indicated fuel amount minus the previous maximum fuel amount.

Step 116, DETERMINE REFUELING RATIO, includes determining a refueling ratio based on the consumed amount and the indicated refueling amount. The refueling ratio provides a means for quantifying how the consumed amount compares to the indicated refueling amount. By way of example and not limitation, the refueling ratio may be equal to the consumed amount divided by the indicated refueling amount.

Step 118, DETERMINE BLENDED RATIO, includes determining a blended ratio based on the refueling ratio and a historic ratio. The blended ratio may be determined as a means for comparing how the amount of fuel consumed by the engine 12 compares with the amount of fuel being added to fuel tank 14 over a period of time. The historic ratio may be equal to a previously determined blended ratio or equal to a value of one when a previously determined blended ratio does not exist. By way of example and not limitation, the blended ratio may be calculated by applying Eq. 1 below.

$$\text{BLENDED RATIO} = ((1-\text{FILTER COEFFICIENT})* (\text{HISTORIC RATIO})) + ((\text{FILTER COEFFICIENT})*(\text{REFUELING RATIO})) \quad \text{Eq. 1}$$

The filter coefficient may be empirically determined such that noise in the refueling ratio is effectively filtered-out.

Step 120, BLENDED RATIO<LOW THRESHOLD?, includes determining if the blended ratio is less than a low threshold. The low threshold may be equal to the smallest value from an empirically derived normal variation range for the blended ratio. The low threshold is typically equal to a value that is less than 1. For example, the low threshold may be equal to 0.7.

Step 122, DETERMINE FALSE DETECTION HAS OCCURRED, includes determining that a false detection of the refueling event by the refueling event detection system 18 has occurred. The determination may be based on the blended ratio being less than the low threshold.

Step 124, BLENDED RATIO>HIGH THRESHOLD?, includes determining if the blended ratio is greater than a high threshold. The high threshold may be equal to the largest value from an empirically derived normal variation range for the blend ratio. The high threshold is typically equal to a value that is greater than 1. For example, the high threshold may be equal to 1.3.

Step 126, DETERMINE REFUELING EVENT HAS NOT BEEN DETECTED, includes determining that the refueling event has not been detected by the refueling event detection system 18. The determination may be based on the blended ratio being greater than the high threshold.

Step 128, DETERMINE REFUELING EVENT DETECTION SYSTEM IS FUNCTIONING PROPERLY, includes determining that the refueling event detection system 18 is functioning properly. The determination may be based on the blended ratio being greater than the low threshold and less than the high threshold.

Step 130, CONSUMED AMOUNT>CONSUMPTION THRESHOLD?, includes determining if the consumed amount is greater than a consumption threshold. The consumed amount may be compared to the consumption threshold as a means for determining whether the refueling event detection system 18 has missed the detection of a refueling event. The consumption threshold may be equal to the largest value from an empirically derived normal variation range for the consumed amount of fuel prior to a refueling event being detected. If the consumed amount is not greater than the consumption threshold, the method may proceed to step 102.

Step 132, DETERMINE REFUELING RATIO BASED ON DEFAULT VALUE, includes determining the refueling ratio based on a default value. As way of example and not limitation, the refueling ratio may be equal to the default value. The default value may be empirically determined such that abnormalities in the refueling event detection system 18 that cause the refueling event detection system 18 to miss the detection of refueling events will be adequately diagnosed. For example, the default value may be equal to 1.5.

Accordingly, a diagnostic method for a refueling event detection system 18 is provided. The diagnoses resulting from the use of the method 100 may be utilized by the engine controller 16 to determine whether to disable the exhaust gas monitoring system 22 based on a refueling event being detected by the refueling event detection system 18. The diagnoses may also be utilized by the engine controller 16 to determine whether to initiate a fuel composition analysis based on a refueling event not being detected by the refueling event detection system 18.

While this invention has been described in terms of the preferred embodiments thereof, it is not intended to be so limited, but rather only to the extent set forth in the claims that follow.

We claim:

1. A method for diagnosing the performance of a refueling event detection system for a vehicle equipped with an engine, said method comprising:

determining a fuel change amount based on a difference of an indicated fuel amount and a previously indicated fuel amount;

determining a consumed amount of fuel consumed by the engine since a prior refueling event was detected; and diagnosing the performance of the refueling event detection system based on the consumed amount and the fuel change amount, wherein the step of diagnosing includes determining an indicated refueling amount based on the fuel change amount if a refueling event is detected;

determining a refueling ratio based on the consumed amount and the indicated refueling amount; and determining a blended ratio based on the refueling ratio and a historic ratio.

2. The method according to claim 1, wherein the step of diagnosing further includes determining that a false detection of the refueling event by the refueling event detection system has occurred if the blended ratio is less than a low threshold.

3. The method according to claim 1, wherein the step of diagnosing further includes determining that the refueling event has not been detected by the refueling event detection system if the blended ratio is greater than a high threshold.

4. The method according to claim 1, wherein the step of diagnosing includes subtracting a compensation amount from an indicated refueling amount if the indicated fuel amount is greater than a previous maximum fuel amount.

5. The method according to claim 4, wherein the compensation amount is determined based on a difference of the indicated fuel amount and the previous maximum fuel amount.

6. The method according to claim 1, wherein the step of diagnosing includes determining a refueling ratio based on a default value if a refueling event is not detected and the consumed amount is greater than a consumption threshold.

* * * * *